US012506856B2

(12) United States Patent
Ong et al.

(10) Patent No.: US 12,506,856 B2
(45) Date of Patent: Dec. 23, 2025

(54) CHANGING FOV AND RESOLUTION FOR CALIBRATING SCANNING DISPLAY SYSTEM ALIGNMENT

(71) Applicant: Microsoft Technology Licensing, LLC, Redmond, WA (US)

(72) Inventors: Xiao Chuan Ong, Seattle, WA (US); Moran Chen, Fairfax, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 94 days.

(21) Appl. No.: 18/514,076

(22) Filed: Nov. 20, 2023

(65) Prior Publication Data

US 2025/0168316 A1    May 22, 2025

(51) Int. Cl.
*H04N 13/327* (2018.01)
*H04N 13/128* (2018.01)
*H04N 13/344* (2018.01)

(52) U.S. Cl.
CPC ......... *H04N 13/327* (2018.05); *H04N 13/128* (2018.05); *H04N 13/344* (2018.05)

(58) Field of Classification Search
CPC ... H04N 13/327; H04N 13/128; H04N 13/344
USPC .......................................................... 348/51
See application file for complete search history.

(56) References Cited

U.S. PATENT DOCUMENTS

| | | | |
|---|---|---|---|
| 5,912,650 A * | 6/1999 | Carollo | H04N 13/344 348/588 |
| 9,191,649 B2 | 11/2015 | Hung et al. | |
| 9,237,338 B1 * | 1/2016 | Maguire, Jr. | G02B 30/27 |
| 9,390,752 B1 * | 7/2016 | McNeill | G11B 27/022 |
| 9,402,065 B2 | 7/2016 | Hwang et al. | |
| 9,986,215 B1 | 5/2018 | Tardif et al. | |
| 10,742,966 B2 * | 8/2020 | Chen | H04N 13/139 |
| 11,778,160 B2 | 10/2023 | Wu | |
| 2007/0165942 A1 | 7/2007 | Jin et al. | |

(Continued)

OTHER PUBLICATIONS

Landau, Francine, "Effect on visual-recognition performance of misregistration and overlap for a biocular helmet-mounted display", In Proceedings of SPIE , vol. 1290, Issue 1, Oct. 1, 1990, pp. 173-184.

(Continued)

*Primary Examiner* — Tung T Vo
(74) *Attorney, Agent, or Firm* — Alleman Hall & Tuttle LLP (57) ABSTRACT

One example provides a display device comprising a scanning display system comprising a left-eye projector and a right-eye projector. The display device further comprises a controller configured to control the scanning display system to, in a display mode, output stereoscopic display images using the left-eye projector and the right-eye projector. The stereoscopic display images comprise a first field of view (FOV) and a first resolution. The controller is further configured to control the scanning display system to, in an alignment mode, output a left-eye alignment image and a right-eye alignment image respectively using the left-eye projector and the right-eye projector. One or more of the left-eye alignment image or the right-eye alignment image comprises a second FOV that is smaller than the first FOV, and a second resolution that is higher than the first resolution.

20 Claims, 8 Drawing Sheets

(56) References Cited

U.S. PATENT DOCUMENTS

| | | | | |
|---|---|---|---|---|
| 2014/0002587 | A1* | 1/2014 | Aguren | H04N 5/272 348/46 |
| 2014/0375681 | A1 | 12/2014 | Steedly et al. | |
| 2015/0029217 | A1* | 1/2015 | Ur | G06F 3/1423 345/629 |
| 2015/0334377 | A1* | 11/2015 | Kishikawa | H04N 13/31 348/54 |
| 2016/0091720 | A1* | 3/2016 | Stafford | G02B 27/0172 345/8 |
| 2016/0240013 | A1* | 8/2016 | Spitzer | G02B 27/0172 |
| 2016/0349510 | A1 | 12/2016 | Miller | |
| 2016/0370855 | A1* | 12/2016 | Lanier | H04N 23/58 |
| 2017/0212717 | A1* | 7/2017 | Zhang | G02B 27/017 |
| 2017/0296421 | A1 | 10/2017 | Travers | |
| 2017/0353714 | A1 | 12/2017 | Poulad et al. | |
| 2018/0081178 | A1* | 3/2018 | Shpunt | H04N 13/383 |
| 2018/0275410 | A1* | 9/2018 | Yeoh | G06F 3/0346 |
| 2019/0208187 | A1* | 7/2019 | Danziger | H04N 13/344 |
| 2019/0287495 | A1* | 9/2019 | Mathur | G06T 15/00 |
| 2020/0177862 | A1* | 6/2020 | Routhier | H04N 13/122 |
| 2020/0233213 | A1 | 7/2020 | Porter | |
| 2020/0396439 | A1* | 12/2020 | Stafford | G09G 3/3208 |
| 2021/0181840 | A1 | 6/2021 | Vlaskamp | |
| 2022/0011661 | A1* | 1/2022 | Wippermann | H04N 23/51 |
| 2022/0197033 | A1* | 6/2022 | Liang | H04N 13/332 |
| 2022/0377306 | A1 | 11/2022 | Borys | |
| 2022/0377312 | A1 | 11/2022 | Samples et al. | |
| 2022/0391013 | A1 | 12/2022 | Vlaskamp | |
| 2023/0221558 | A1* | 7/2023 | Parker | H04N 23/23 345/8 |
| 2024/0112294 | A1* | 4/2024 | Zhou | G06T 1/60 |

OTHER PUBLICATIONS

Extended European search report received for European Application No. 25156775.6, mailed on Jun. 23, 2025, 11 pages.

* cited by examiner

CHANGING FOV AND RESOLUTION FOR CALIBRATING SCANNING DISPLAY SYSTEM ALIGNMENT

BACKGROUND

A head mounted display (HMD) device may use a binocular display with separate left-eye images and right-eye images for displaying three-dimensional (3D) content, such as virtual reality (VR) and/or augmented reality (AR) content. These images are generated using separate projectors on the HMD device. However, misalignment between the separate projectors may result in vertical disparity between the left-eye images and the right-eye images. Such vertical disparity (e.g., dipvergence) may impact an experience for a user of the HMD device.

Some HMD devices with non-rigid frames may be more susceptible to misalignment between the left-eye and right-eye images than HMD devices with rigid frames. To address such misalignment issues, some HMD devices utilize a display alignment system for monitoring alignment between the separate projectors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example provides a display device comprising a scanning display system. The scanning display system comprises a left-eye projector and a right-eye projector. The display device further comprises a controller configured to control the scanning display system to, in a display mode, output stereoscopic display images using the left-eye projector and the right-eye projector. The stereoscopic display images comprise a first field of view (FOV) and a first resolution. The controller is further configured to control the scanning display system to, in an alignment mode, output a left-eye alignment image and a right-eye alignment image respectively using the left-eye projector and the right-eye projector. One or more of the left-eye alignment image or the right-eye alignment image comprises a second FOV that is smaller than the first FOV and a second resolution that is higher than the first resolution.

DETAILED DESCRIPTION

As mentioned above, an HMD device can display 3D content utilizing a left-eye projector and a right-eye projector. Some HMD devices may utilize a display alignment system to monitor alignment of stereoscopic display images from the left-eye projector and the right-eye projector. Such display alignment systems enable the HMD device to adjust a display position of one or both of the stereoscopic display images to help reduce user discomfort, such as can arise from the previously mentioned dipvergence.

A misalignment of the stereoscopic display images may arise from sources such as calibration errors and/or physical deformation of the HMD device (e.g., temperature changes, drift over time of the HMD device, and/or physical stresses such as shock). Current display alignment systems utilize alignment images, also referred to as fiducial images, to help calibrate an alignment offset of the left-eye and right-eye projectors. However, calibration precision is dependent on resolution of the stereoscopic display images from the left-eye and right-eye projectors. As an example, a projector that outputs a resolution of 45 pixels per degree can adjust a display position of one or both of the stereoscopic display images in increments of 1/45 of a degree. This can still allow perceptible visual disparity in the stereoscopic display images.

Accordingly, examples are disclosed that relate to dynamically increasing a resolution from a scanning display system by switching from a display mode to an alignment mode for calibrating an alignment offset. Briefly, a display device comprises a scanning display system comprising a left-eye projector and a right-eye projector. The display device further comprises a controller configured to control the scanning display system to output, in a display mode, stereoscopic display images comprising a first field of view (FOV) and a first resolution. The controller is further configured to control the scanning display system to output, in an alignment mode, a left-eye alignment image and a right-eye alignment image. Further, one or more of the left-eye alignment image or the right-eye alignment image comprises a second FOV that is smaller than the first FOV, and a second resolution that is higher than the first resolution. In the alignment mode, an alignment offset is calibrated using the left-eye and right-eye alignment images comprising the second resolution. This can enable adjusting the display position of one or both of the stereoscopic display images to be within the human visual perception threshold. This also enables the display device to utilize the same projectors to output a higher resolution when in the alignment mode for increased calibration precision while also maintaining resolution and FOV requirements of the stereoscopic display images when in the display mode.

Figure 1A:
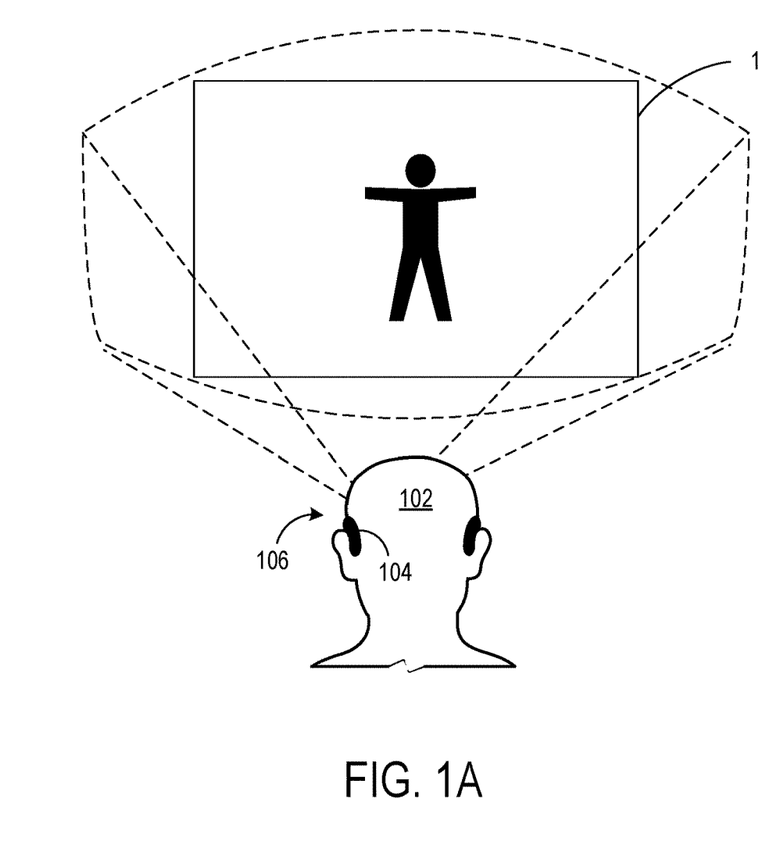
FIGS. 1A-1B schematically depict example stereoscopic display images.
Figure 1B:
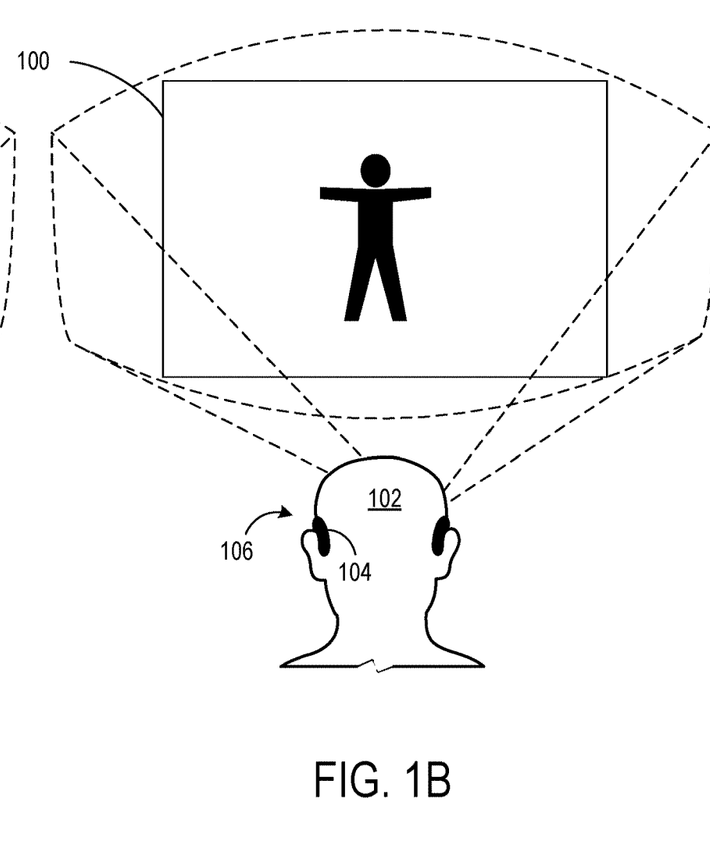

FIGS. 1A and 1B schematically depict example stereoscopic display images 100. Here, a user 102 utilizes an HMD device 104 in a display mode to view stereoscopic display images 100. HMD device 104 comprises a scanning display system 106 comprising a left-eye projector and a right-eye projector. Here, the left-eye projector and the right-eye projector output a left-eye image and a right-eye image to form stereoscopic display images 100. This can enable the display of VR and/or AR content. In other examples, other types of stereoscopic display images can be displayed.

Figure 2A:
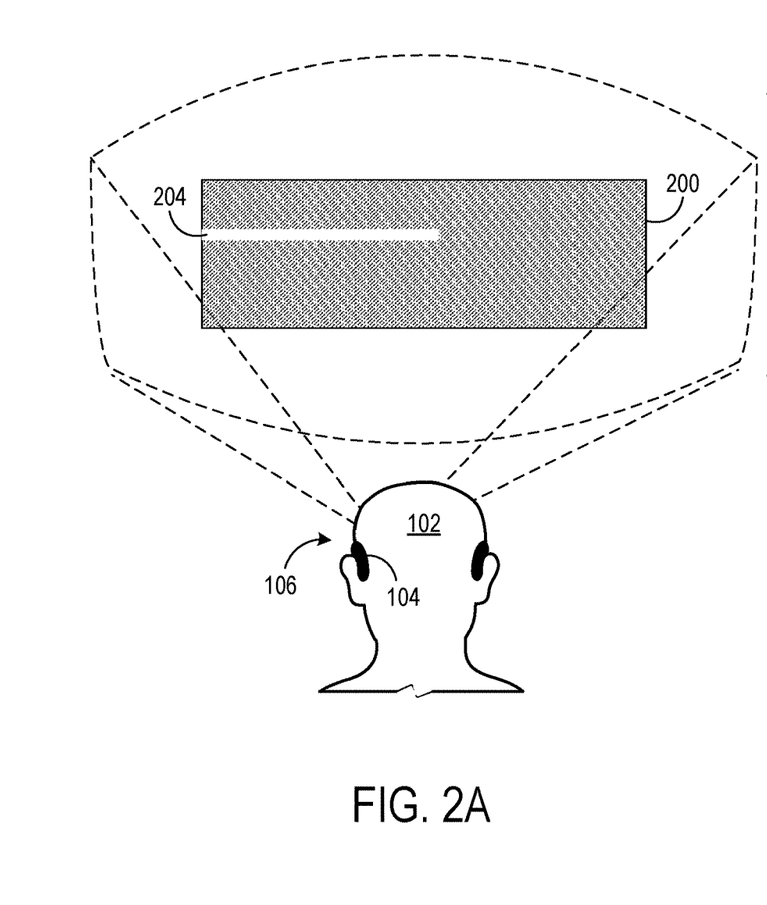
FIGS. 2A-2B schematically depict an example left-eye alignment image and an example right-eye alignment image, respectively.
Figure 2B:
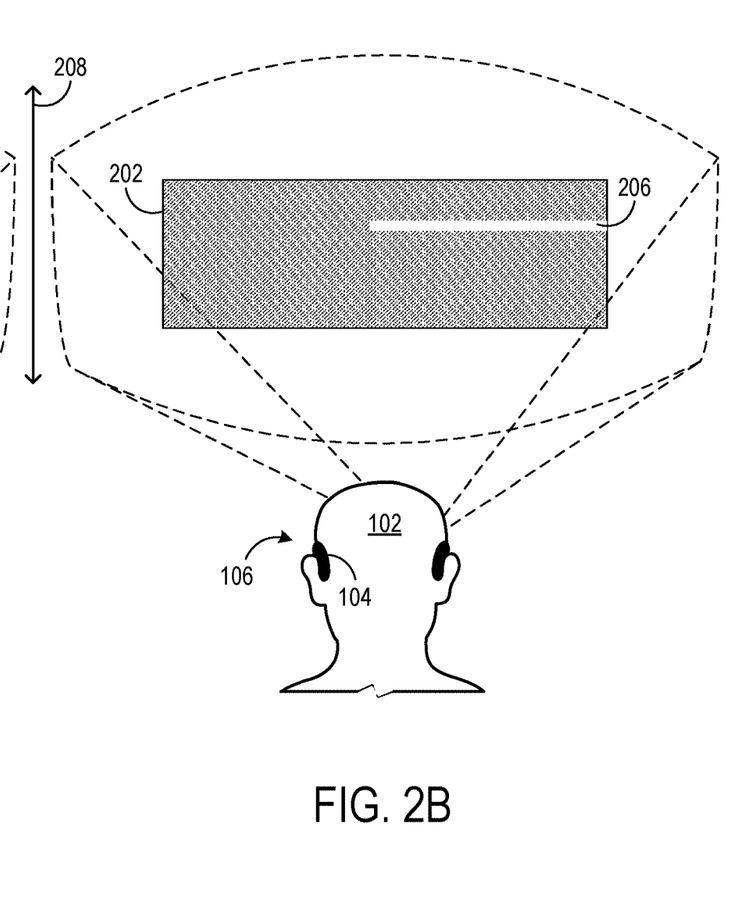

As previously mentioned, misalignment of the left-eye projector and the right-eye projector may result in disparity between the left-eye image and the right-eye image. To address such disparity, HMD device 104 is configured to adjust a display position of one or both of the stereoscopic display images 100 using an alignment offset when operating in the display mode. The alignment offset is calibrated when HMD device 104 is operating in an alignment mode, as schematically depicted in FIGS. 2A and 2B. In FIG. 2A, the left-eye projector outputs an example left-eye alignment image 200. Left-eye alignment image 200 can comprise a same number of scanned image lines (not depicted) as stereoscopic display images 100, but within a smaller FOV, than a FOV of stereoscopic display images 100 in a vertical direction 208. This results in an increased scanned line density, providing a higher resolution for left-eye alignment image 200 than for stereoscopic display images 100. In such a manner, the resolution of left-eye alignment image 200 can be higher than what can be perceived by user 102. This can help to increase calibration precision of the alignment offset compared to utilizing a lower resolution image, such as stereoscopic display images 100.

In FIG. 2B, the right-eye projector outputs an example right-eye alignment image 202. Similar to left-eye alignment image 200, right-eye alignment image 202 also comprises a FOV that is smaller than the FOV of stereoscopic display images 100, and also comprises a resolution that is higher than the resolution of stereoscopic display images 100. Left-eye alignment image 200 and right-eye alignment image 202 comprise a pair of dipchoptic images in the form of left line 204 and right line 206. The pair of dipchoptic lines can have high spatial frequency, with relatively sharp edges having relatively high contrast compared to a background. This helps to enable the higher calibration precision of the alignment offset, and may be more easily detectable to user 102 than images with low spatial frequency, such as stereoscopic display images 100, for example. In other examples, either left-eye alignment image 200 or right-eye alignment image 202 can comprise a different FOV and/or resolution.

To calibrate the alignment offset in the current example, user 102 can manually change a vertical angular offset of left-eye alignment image 200 and/or right-eye alignment image 202 to visually align left line 204 and right line 206 in the vertical direction 208. Based on the manual changes from user 102, HMD device 104 can determine and then store the alignment offset. FIGS. 1A, 1B, 2A, and 2B are illustrative. In other examples, other images can be used for stereoscopic display images, a left-eye alignment image and/or a right-eye alignment image.

Figure 3A:
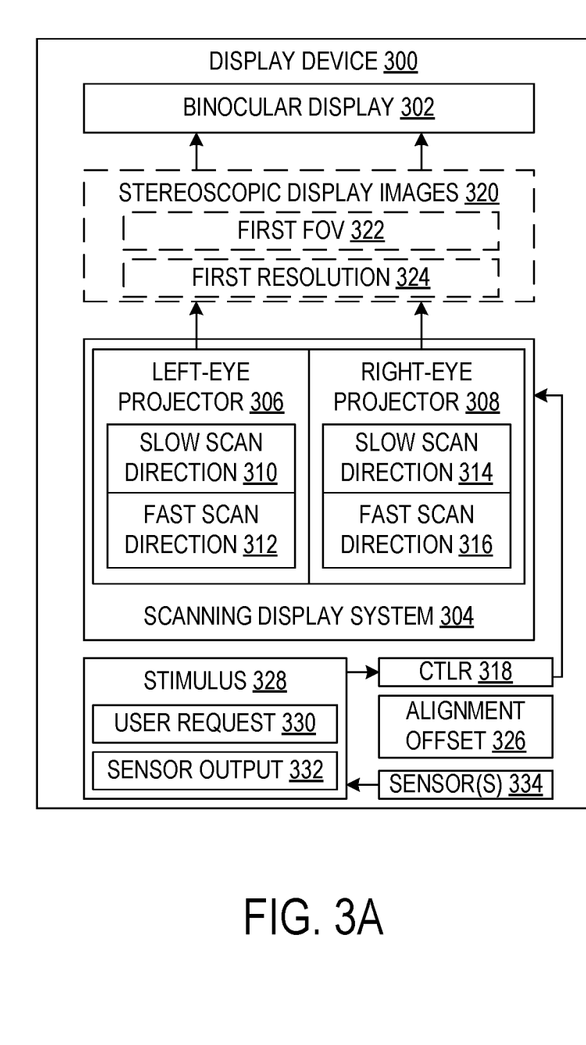
FIGS. 3A-3B show a block diagram of an example display device in a display mode and in an alignment mode, respectfully.

FIG. 3A shows a block diagram of an example display device 300 operating in a display mode. HMD device 104 is an example of display device 300. Display device 300 comprises a binocular display 302 and a scanning display system 304 for displaying user content. Scanning display system 304 comprises a left-eye projector 306 and a right-eye projector 308. Left-eye projector 306 and right-eye projector 308 are scanning projectors. Left-eye projector 306 comprises a slow scan direction 310 and a fast scan direction 312. For example, the slow scan direction 310 can be a vertical direction, and the fast scan direction 312 can be a horizontal direction. As such, left-eye projector 306 comprises one or more scanning optics configured to rotate in slow scan direction 310 and fast scan direction 312 to raster scan a projected image. In some examples, left-eye projector 306 comprises a first scanning optic for slow scan direction 310 and a second scanning optic for fast scan direction 312. In other examples, a same scanning optic can be used for both slow scan direction 310 and fast scan direction 312. Examples of scanning optics include scanning mirrors (e.g., microelectromechanical system mirrors), scanning refractive optics, and other suitable scanning mechanisms. Similarly, right-eye projector 308 also comprises a slow scan direction 314 and a fast scan direction 316 to raster scan a projected image.

Display device 300 further comprises a controller 318. In the example of FIG. 3A, controller 318 is configured to operate scanning display system 304 in the display mode. In the display mode, controller 318 is configured to control left-eye projector 306 and right-eye projector 308 to output stereoscopic display images 320 having a first FOV 322 and a first resolution 324 in a display mode. A display position of a left-eye image and/or a right-eye image of stereoscopic display images 320 can be adjusted using a calibrated vertical alignment offset 326. This helps to correct a misalignment in scanning display system 304 in the display mode. Stereoscopic display images 100 can be used for stereoscopic display images 320, for example.

Figure 3B:
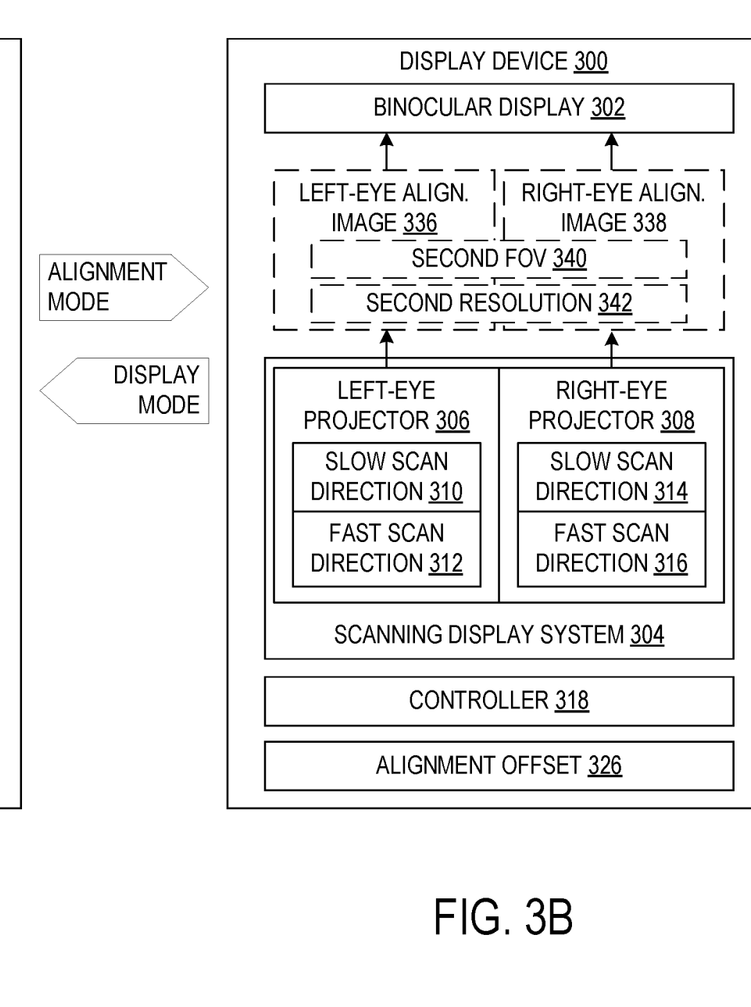

Controller 318 is further configured to switch scanning display system 304 from operating in the display mode, as depicted in FIG. 3A, to operating in an alignment mode, as depicted in FIG. 3B, in response to receiving a stimulus 328. In some examples, stimulus 328 can comprise a user request 330 to switch to the alignment mode, such as when a user wants to calibrate alignment offset 326. Alternatively or additionally, stimulus 328 can comprise sensor output 332 from one or more sensors 334, such as a thermometer, an inertial measurement unit, a humidity sensor, a counter, a timer and/or another suitable sensor, for example. One or more sensors 334 are configured to detect one or more conditions in which a misalignment of left-eye projector 306 and right-eye projector 308 may occur, such as shock from an impact on display device 300, for example. In other examples, display device 300 can operate in the alignment mode at the start of a new user session, or in another suitable manner.

In FIG. 3B, display device 300 is operating in the alignment mode, such as for calibrating alignment offset 326, for example. Therefore, controller 318 is configured to control left-eye projector 306 to output a left-eye alignment image 336 and to control right-eye projector 308 to output a right-eye alignment image 338 in the alignment mode. As shown, each of left-eye alignment image 336 and right-eye alignment image 338 comprises a second FOV 340 and a second resolution 342. Second FOV 340 is smaller than first FOV 322. Additionally, second resolution 342 is higher than first resolution 324. In such a configuration, alignment offset 326 can be calibrated with higher precision using left-eye alignment image 336 and right-eye alignment image 338 than using stereoscopic display images 320. In other examples, either left-eye alignment image 336 or right-eye alignment image 338 can comprise second FOV 340 and second resolution 342. In such examples, the other of left-eye alignment image 336 or right-eye alignment image 338 can comprise another suitable FOV and/or resolution.

In the alignment mode, controller 318 is configured to control left-eye projector 306 to output left-eye alignment image 336 comprising second resolution 342 by controlling slow scan direction 310 of left-eye projector 306 to increase a scanned line density in slow scan direction 310 compared to in the display mode, as discussed in more detail with reference to FIGS. 4, 5, and 6. Similarly, controller 318 also is configured to control slow scan direction 314 of right-eye projector 308 by controlling slow scan direction 314 of right-eye projector 308 to increase a scanned line density in slow scan direction 314 compared to in the display mode.

In some examples, left-eye alignment image 336 and right-eye alignment image 338 are a pair of dipchoptic images. Such a pair of dipchoptic images can help a user of display device 300 to visually calibrate alignment offset 326, such as discussed above with reference to FIGS. 2A and 2B. For example, the user can make manual inputs that bring left-eye alignment image 336 and right-eye alignment image 338 into closer vertical correspondence. The resulting degree of movement of the left-eye alignment image 336 and/or the right-eye alignment image 338 corresponds to the alignment offset 326. In other examples, other suitable alignment images can be used. After alignment offset 326 is calibrated, display device 300 is configured to store alignment offset 326 for use in the display mode as discussed above.

As previously mentioned, changing to a smaller FOV and a higher resolution of a projected image can be performed by increasing scanned line density in a slow scan direction of a scanning projector, such as left-eye projector 306 and/or right-eye projector 308. FIG. 4 schematically depicts an example plot 400 illustrating a relationship between FOV 402 and scanned line density 404 for a constant scanned line count. As can be seen, FOV 402 is inversely proportional to scanned line density 404 for the same scanned line count.

Scanning display system 304 can increase scanned line density by reducing FOV to output left-eye alignment image 336 and right-eye alignment image 338 when switching from the display mode to the alignment mode, for example. Here, a FOV and scanned line density of example display images are shown at point 406, and a FOV and scanned line density of example alignment images are shown at point 408.

Figure 4:
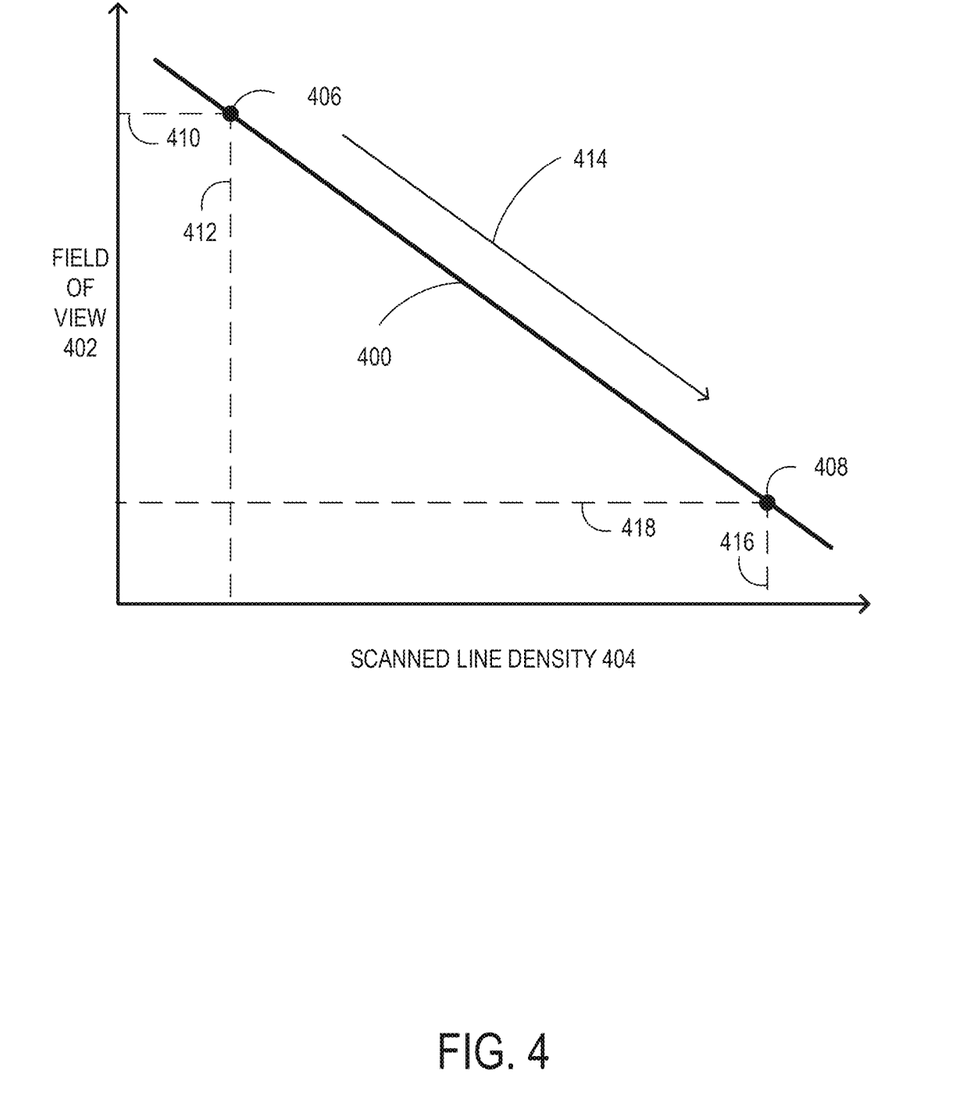
FIG. 4 schematically shows an example plot of FOV and scanned line density.
Figure 5:
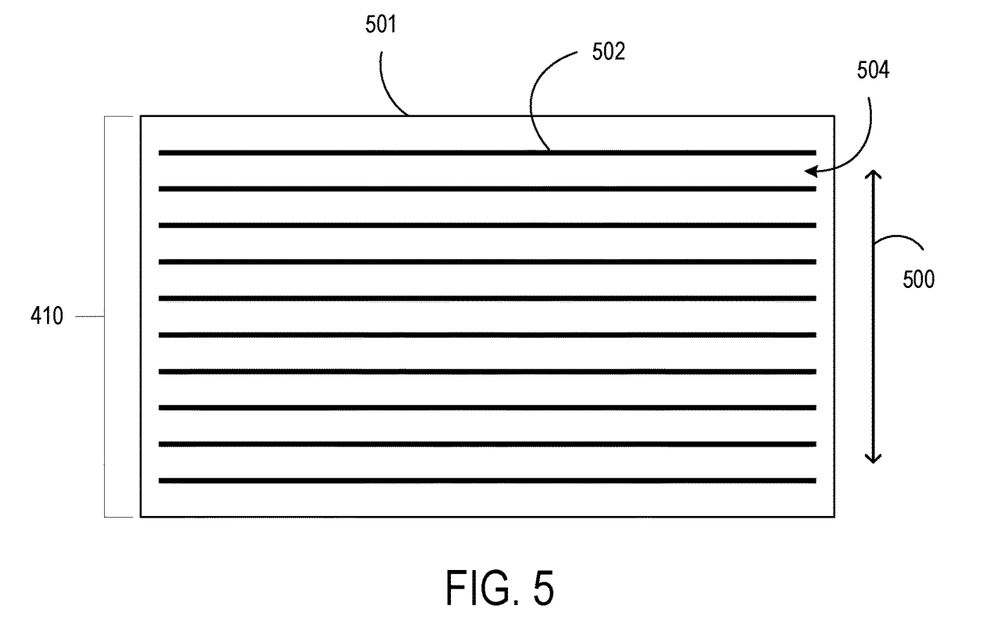
FIGS. 5-6 schematically depict example projected images utilizing different scanned line densities.

As illustrated by FIG. 5, a first projected image 501, represented by point 406 in FIG. 4, comprises a first FOV 410 and a first scanned line density 412 in a slow scan direction 500. First projected image 501 comprises scanned image lines 502. Each scanned image line 502 is separated from at least one adjacent scanned image line 502 by a scanned line spacing 504. Scanned line spacing 504 determines first scanned line density 412 (e.g., a resolution of first projected image 501).

Figure 6:
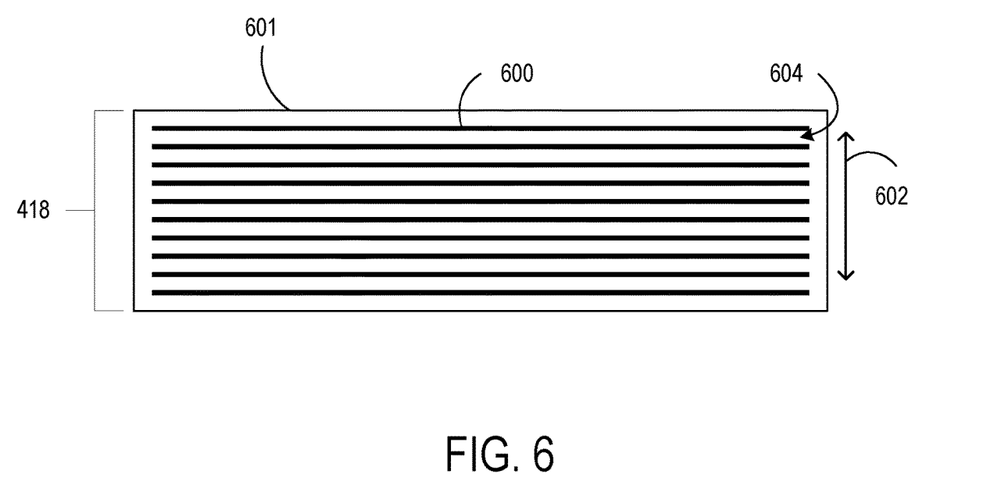

FIG. 6 illustrates the effect of increasing scanned line density 404 when switching the scanning display system from the display mode to the alignment mode. As can be seen, a second projected image 601, represented by point 408 in FIG. 4, comprises a second scanned line density 416 that is higher than first scanned line density 412, and also comprises a second FOV 418 that is smaller than first FOV 410. As schematically depicted in FIG. 6, second projected image 601 comprises scanned image lines 600 in a slow scan direction 602 having a same scanned line count as scanned image lines 502. However, second projected image 601 has a scanned line spacing 604 that is smaller than scanned line spacing 504. Therefore, second FOV 418 is smaller than first FOV 410. Also, second scanned line density 416 is higher than first scanned line density 412, as the scanned line count is the same. Scanned line spacing 604 can be shorter than scanned line spacing 504 by any suitable factor. In such a manner, resolution can be increased for alignment images after switching a scanning display system from a display mode to an alignment mode. FIGS. 4, 5, and 6 are illustrative. In other examples, a projected image can have another configuration.

Figure 7:
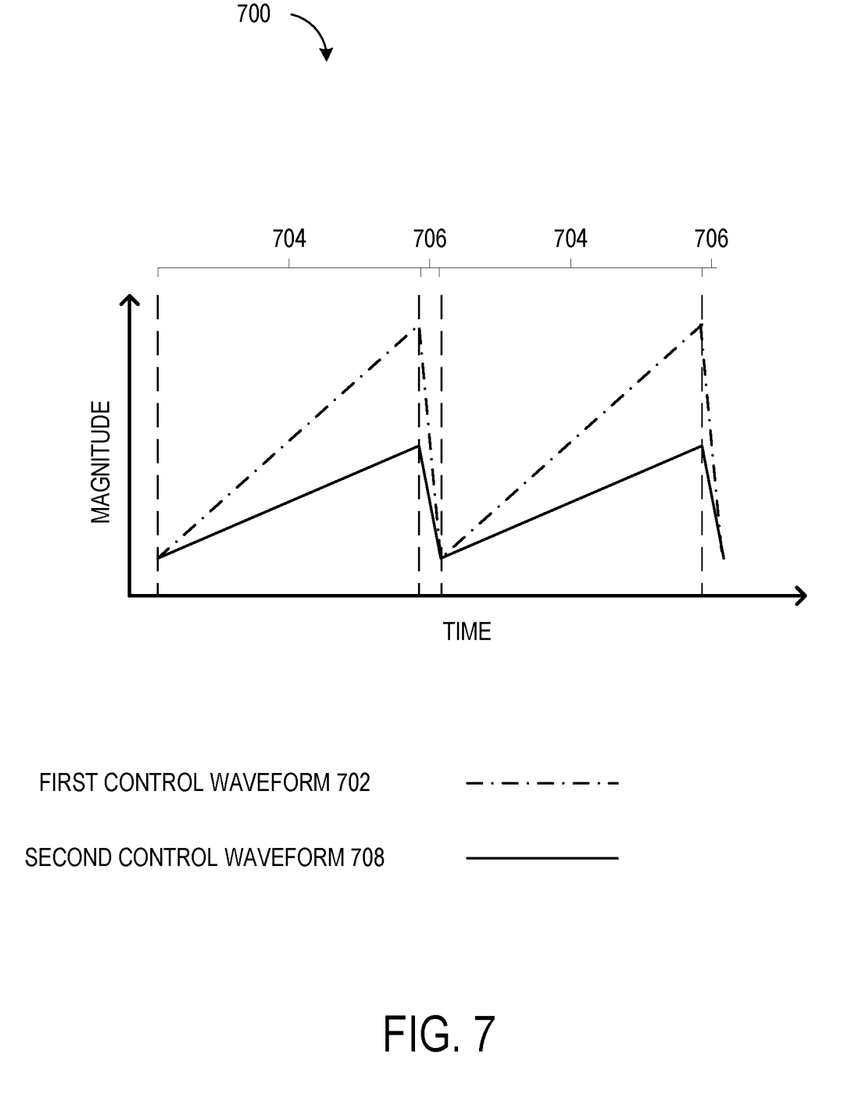
FIG. 7 schematically illustrates an example plot of control waveforms for a scanning display system.

A scanning display system can utilize a control waveform for controlling a slow scan direction of a scanning projector. The control waveform can be used to control a rotational angle over time of a scanning optic of the scanning projector, for example. FIG. 7 schematically illustrates an example plot 700 depicting magnitudes over time for such control waveforms in the slow scan direction. Here, a first control waveform 702 is used to control a slow scan direction of a scanning projector to output first projected image 501. First control waveform 702 can be used to control left-eye projector 306 and/or right-eye projector 308 in a display mode, for example. More specifically, a ramp-up rate of first control waveform 702 during a projection period 704 is used to control scanned line density of first projected image 501. As can be seen, first control waveform 702 controls the slow scan direction of the scanning projector to have a linear trajectory during the projection period 704. Such a configuration can help to reduce control logic complexity over a non-linear control waveform for a non-linear trajectory. Additionally, a ramp-down rate of first control waveform 702 during a retrace period 706 is used to return the scanning projector to a start position for next frame data of first projected image 501.

A second control waveform 708 is used to control the slow scan direction of the scanning projector to output second projected image 601. Second control waveform 708 can be used to control left-eye projector 306 and/or right-eye projector 308 in an alignment mode, for example. As can be seen, second control waveform 708 has a lower relative magnitude than first control waveform 702. In such a manner, second control waveform 708 controls the slow scan direction of the scanning projector with a higher scanned line density over the scanned line density resulting from first control waveform 702. As a specific example, second control waveform 708 controls the scanning projector to output the higher scanned line density and the smaller FOV of second projected image 601 compared to the lower scanned line density and the larger FOV of first projected image 501. Further, second control waveform 708 also controls the slow scan direction of the scanning projector to have a linear trajectory during the projection period 704. The scanned line density of the scanning projector, such as for scanning display system 304, can be dynamically switched during operation of the scanning projector by dynamically switching from first control waveform 702 to second control waveform 708. Plot 700 is illustrative. In other examples, other suitable control waveforms can be used.

Figure 8:
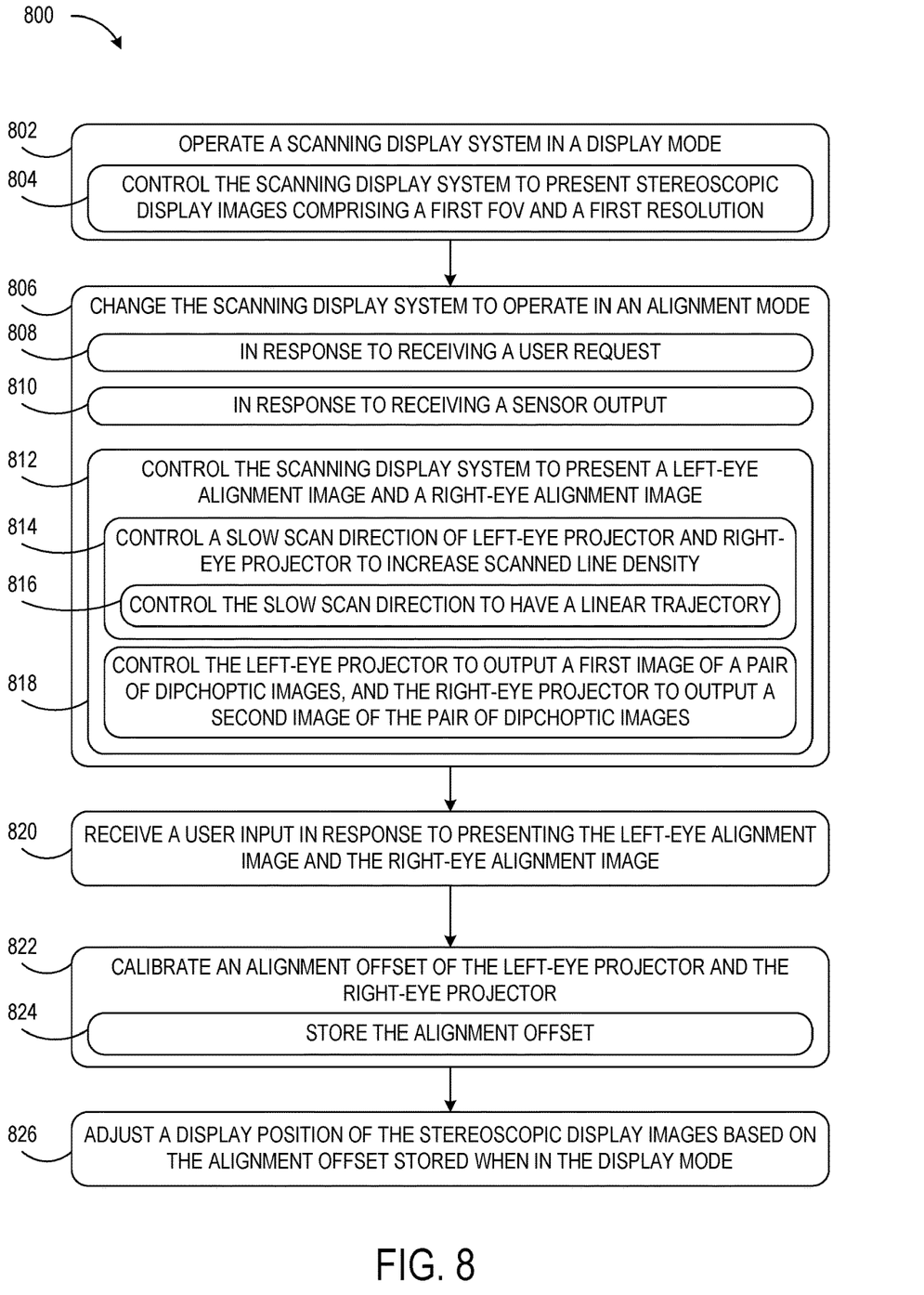
FIG. 8 illustrates a flow diagram of an example method of operating a display device utilizing a display mode and an alignment mode.

FIG. 8 illustrates a flow diagram of an example method 800 for operating a scanning display system comprising a display mode and an alignment mode. Method 800 can be performed by any suitable display device comprising a scanning display system, such as HMD device 104 or display device 300, for example. Method 800 comprises, at 802, operating the scanning display system in a display mode. Operating the scanning display system in the display mode comprises controlling a left-eye projector and a right-eye projector of the scanning display system to present stereoscopic display images comprising a first FOV and a first resolution, as indicated at 804.

Method 800 comprises, at 806, changing the scanning display system to operate in an alignment mode. The alignment mode is used to calibrate an alignment offset of the left-eye projector and the right-eye projector. Changing the scanning display system to operate in the alignment mode can be performed in response to receiving a user request to switch to the alignment mode, as indicated at 808. In such a manner, a user can update a calibration of the alignment offset when desired. Alternatively or additionally, changing the scanning display system to operate in the alignment mode can be performed in response to receiving a sensor output that meets a threshold condition, as indicated at 810. For example, the threshold condition may be met when a thermometer detects a temperature change that may change the alignment of the scanning display system. As another example, the threshold condition may be met when an internal measurement unit detects a shock that may change the alignment of the scanning display system. In other examples, changing the scanning display system to operate in the alignment can be done in another suitable manner, such as at a start of a new user session, for example. In further examples, 808 and/or 810 can be omitted.

Operating the scanning display system in the alignment mode comprises controlling the left-eye projector and the right-eye projector respectively to present a left-eye alignment image and a right-eye alignment image, as indicated at 812. Further, one or more of the left-eye alignment image or the right-eye alignment image comprises a second FOV that is smaller than the first FOV, and also comprises a second resolution that is higher than the first resolution, such as depicted in second projected image 601, for example.

Presenting the left-eye alignment image and the right-eye alignment image comprising the second FOV and the second resolution comprises controlling, at 814, a slow scan direction of the left-eye projector and the right-eye projector to increase scanned line density in the slow scan direction when operating in the alignment mode. This can help to enable dynamic switching from the display mode to the alignment mode. For example, dynamically switching from first control waveform 702 to second control waveform 708 increases the scanned line density in the slow scan direction of the left-eye projector and/or the right-eye projector, such as seen in second projected image 601, for example.

In some examples, presenting the left-eye alignment image and the right-eye alignment image by the scanning display system operating in the alignment mode can comprise, at 816, controlling the slow scan direction of the left-eye projector and the right-eye projector to have a linear trajectory. The linear trajectory can help to reduce control logic complexity compared to a non-linear trajectory. Further, in some examples, controlling the left-eye projector and the right-eye projector to respectively present the left-eye alignment image and the right-eye alignment image can comprise, at 818, controlling the left-eye projector to output a first image of a pair of dipchoptic images, and the right-eye projector to output a second image of the pair of dipchoptic images, such as the pair of dipchoptic images depicted in FIGS. 2A and 2B, for example. In other examples, other suitable alignment images can be used.

Continuing, method 800 comprises, at 820, receiving a user input in response to presenting the left-eye alignment image and the right-eye alignment image. The user input can indicate a manual adjustment of the alignment of the left-eye projector and/or the right-eye projector. Method 800 further comprises, based at least upon the user input, calibrating, at 822, an alignment offset of the left-eye projector and the right-eye projector, and storing, at 824, the alignment offset. Method 800 also comprises adjusting a display position of one or both of the stereoscopic display images based on the alignment offset stored when in the display mode, as indicated at 826. In such a manner, the user can update calibrating the alignment offset. This can help to reduce or prevent user discomfort from dipvergence.

A display device comprising a scanning display system utilizing a display mode and an alignment mode as disclosed herein may allow a more precise alignment offset to be set when using the higher resolution of the alignment mode over a precision of the lower resolution of the display mode. This may reduce an error in the alignment of the scanning display system to a level below the human visible perceptible threshold. Further, the scanning display system helps to enable versatility of the display device by changing FOV and resolution of the scanning display system for different applications including the disclosed display mode and alignment mode.

In some examples, the methods and processes described herein may be tied to a computing system of one or more computing devices. In particular, such methods and processes may be implemented as a computer-application program or service, an application-programming interface (API), a library, and/or other computer-program product.

Figure 9:
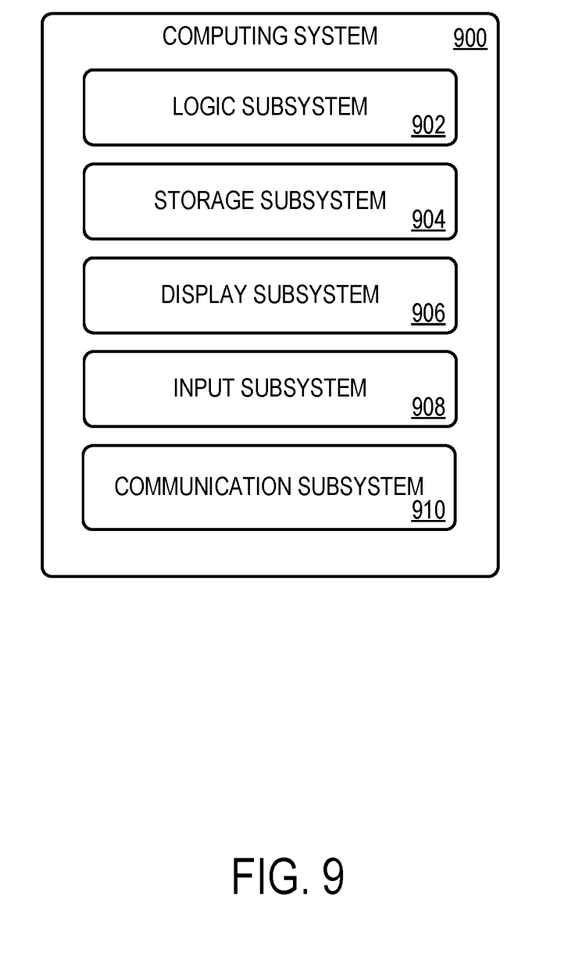
FIG. 9 shows a block diagram of an example computing system.

FIG. 9 schematically shows an example computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices. HMD device 94 and display device 300 are examples of computing system 900.

Computing system 900 includes a logic subsystem 902 and a storage subsystem 904. Computing system 900 may optionally include a display subsystem 906, input subsystem 908, communication subsystem 910, and/or other components not shown in FIG. 9.

Logic subsystem 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 904 includes one or more physical devices configured to hold instructions executable by the logic machine to implement the methods and processes described herein. When such methods and processes are implemented, the state of storage subsystem 904 may be transformed—e.g., to hold different data.

Storage subsystem 904 may include removable and/or built-in devices. Storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 902 and storage subsystem 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic subsystem 902 executing instructions held by storage subsystem 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by storage subsystem 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

When included, input subsystem 908 may comprise or interface with one or more user-input devices such as a keyboard, mouse, touch screen, or game controller. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some examples, the communication subsystem may allow computing system 900 to send and/or receive messages to and/or from other devices via a network such as the Internet.

Another example provides a display device comprising a scanning display system comprising a left-eye projector and a right-eye projector, and a controller configured to control the scanning display system to, in a display mode, output stereoscopic display images using the left-eye projector and the right-eye projector, the stereoscopic display images comprising a first field of view (FOV) and a first resolution, and in an alignment mode, output a left-eye alignment image and a right-eye alignment image respectively using the left-eye projector and the right-eye projector, one or more of the left-eye alignment image or the right-eye alignment image comprising a second FOV that is smaller than the first FOV, and a second resolution that is higher than the first resolution. In some such examples, the one or more of the left-eye projector or the right-eye projector alternatively or additionally comprises a slow scan direction and a fast scan direction, and the controller is configured to control the slow scan direction of the one or more of the left-eye projector or the right-eye projector to increase scanned line density in the slow scan direction in the alignment mode. In some such examples, the controller alternatively or additionally is configured to control the slow scan direction of the one or more of the left-eye projector or the right-eye projector to have a linear trajectory in the alignment mode. In some such examples, the display device alternatively or additionally comprises a head mounted (HMD) device. In some such examples, the controller alternatively or additionally is configured to control the scanning display system to output the left-eye alignment image and the right-eye alignment image by controlling the left-eye projector to output a first image of a pair of dipchoptic images, and the right-eye projector to output a second image of the pair of dipchoptic images. In some such examples, the controller alternatively or additionally is configured to switch the scanning display system from the display mode to the alignment mode in response to receiving a stimulus, the stimulus comprising one or more of a user request or a sensor output. In some such examples, the controller alternatively or additionally is configured to switch the scanning display system from the display mode to the alignment mode by dynamically switching from a first control waveform to a second control waveform for one or more of the left-eye projector or the right-eye projector.

Another example provides a head mounted display (HMD) device comprising a scanning display system comprising a left-eye projector and a right-eye projector, and a controller configured to control the scanning display system to, in a display mode, output stereoscopic display images using the left-eye projector and the right-eye projector, the stereoscopic display images comprising a first field of view (FOV) and a first resolution, and in an alignment mode, output a left-eye alignment image and a right-eye alignment image respectively using the left-eye projector and the right-eye projector, one or more of the left-eye alignment image or the right-eye alignment image comprising a second FOV that is smaller than the first FOV, and a second resolution that is higher than the first resolution. In some such examples, one or more of the left-eye projector or the right-eye projector alternatively or additionally comprises a slow scan direction and a fast scan direction, and the controller is configured to control the slow scan direction of the one or more of the left-eye projector or the right-eye projector to increase scanned line density in the slow scan direction in the alignment mode. In some such examples, the controller alternatively or additionally is configured to control the slow scan direction of the one or more of the left-eye projector or the right-eye projector to have a linear trajectory in the alignment mode. In some such examples, the controller alternatively or additionally is configured to control the scanning display system to output the left-eye alignment image and the right-eye alignment image by controlling the left-eye projector to output a first image of a pair of dipchoptic images, and the right-eye projector to output a second image of the pair of dipchoptic images. In some such examples, the controller alternatively or additionally is configured to switch the scanning display system from the display mode to the alignment mode in response to receiving a stimulus, the stimulus comprising one or more of a user request or a sensor output. In some such examples, the controller alternatively or additionally is configured to switch the scanning display system from the display mode to the alignment mode by dynamically switching from a first control waveform to a second control waveform.

Another example provides a method enacted on a head mounted display (HMD) device comprising a scanning display system comprising a left-eye projector and a right-eye projector. The method comprises operating the scanning display system in a display mode in which the left-eye projector and the right-eye projector are controlled to present stereoscopic display images comprising a first field of view (FOV) and a first resolution, changing the scanning display system to operate in an alignment mode in which the left-eye projector and the right-eye projector respectively are controlled to present a left-eye alignment image and a right-eye alignment image, one or more of the left-eye alignment image or the right-eye alignment image comprising a second FOV that is smaller than the first FOV and also comprising a second resolution that is higher than the first resolution, receiving a user input in response to presenting the left-eye alignment image and the right-eye alignment image, and based at least upon the user input, calibrating an alignment offset of the left-eye projector and the right-eye projector. In some such examples, presenting the left-eye alignment image and the right-eye alignment image comprising the second FOV and the second resolution alternatively or additionally comprises controlling a slow scan direction of the left-eye projector and the right-eye projector to increase scanned line density in the slow scan direction when operating in the alignment mode. In some such examples, presenting the left-eye alignment image and the right-eye alignment image by the scanning display system operating in the alignment mode alternatively or additionally comprises controlling the slow scan direction of the left-eye projector and the right-eye projector to have a linear trajectory. In some such examples, operating in the alignment mode in which the left-eye projector and the right-eye projector are controlled to present the left-eye alignment image and the right-eye alignment image alternatively or additionally comprises controlling the left-eye projector to output a first image of a pair of dipchoptic images, and the right-eye projector to output a second image of the pair of dipchoptic images. In some such examples, calibrating the alignment offset of the left-eye projector and the right-eye projector alternatively or additionally comprises storing the alignment offset, and adjusting a display position of at least one of the stereoscopic display images based on the alignment offset stored when in the display mode. In some such examples, changing the scanning display system to operate in the alignment mode alternatively or additionally comprises changing the scanning display system to operate in the alignment mode in response to receiving a user request to switch to the alignment mode. In some such examples, changing the scanning display system to operate in the alignment mode alternatively or additionally comprises changing the scanning display system to operate in the alignment mode in response to receiving a sensor output that meets a threshold condition.

It will be understood that the configurations and/or approaches described herein are exemplary in nature, and that these specific examples or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device comprising:
   a scanning display system comprising a left-eye projector and a right-eye projector; and
   a controller configured to control the scanning display system to,
      in a display mode, output stereoscopic display images using the left-eye projector and the right-eye projector, the stereoscopic display images comprising a first field of view (FOV) and a first resolution, and
      in an alignment mode, output a left-eye alignment image and a right-eye alignment image respectively using the left-eye projector and the right-eye projector, one or more of the left-eye alignment image or the right-eye alignment image comprising a second FOV that is smaller than the first FOV, and a second resolution that is higher than the first resolution.

2. The display device of claim 1, wherein the one or more of the left-eye projector or the right-eye projector comprises a slow scan direction and a fast scan direction, and wherein the controller is configured to control the slow scan direction of the one or more of the left-eye projector or the right-eye projector to increase scanned line density in the slow scan direction in the alignment mode.

3. The display device of claim 2, wherein the controller is configured to control the slow scan direction of the one or more of the left-eye projector or the right-eye projector to have a linear trajectory in the alignment mode.

4. The display device of claim 2, wherein the display device comprises a head mounted (HMD) device.

5. The display device of claim 1, wherein the controller is configured to control the scanning display system to output the left-eye alignment image and the right-eye alignment image by controlling the left-eye projector to output a first image of a pair of dipchoptic images, and the right-eye projector to output a second image of the pair of dipchoptic images.

6. The display device of claim 1, wherein the controller further is configured to switch the scanning display system from the display mode to the alignment mode in response to receiving a stimulus, the stimulus comprising one or more of a user request or a sensor output.

7. The display device of claim 6, wherein the controller is configured to switch the scanning display system from the display mode to the alignment mode by dynamically switching from a first control waveform to a second control waveform for one or more of the left-eye projector or the right-eye projector.

8. A head mounted display (HMD) device comprising:
a scanning display system comprising a left-eye projector and a right-eye projector; and
a controller configured to control the scanning display system to,
in a display mode, output stereoscopic display images using the left-eye projector and the right-eye projector, the stereoscopic display images comprising a first field of view (FOV) and a first resolution, and
in an alignment mode, output a left-eye alignment image and a right-eye alignment image respectively using the left-eye projector and the right-eye projector, one or more of the left-eye alignment image or the right-eye alignment image comprising a second FOV that is smaller than the first FOV, and a second resolution that is higher than the first resolution.

9. The HMD device of claim 8, wherein one or more of the left-eye projector or the right-eye projector comprises a slow scan direction and a fast scan direction, and wherein the controller is configured to control the slow scan direction of the one or more of the left-eye projector or the right-eye projector to increase scanned line density in the slow scan direction in the alignment mode.

10. The HMD device of claim 9, wherein the controller further is configured to control the slow scan direction of the one or more of the left-eye projector or the right-eye projector to have a linear trajectory in the alignment mode.

11. The HMD device of claim 8, wherein the controller is configured to control the scanning display system to output the left-eye alignment image and the right-eye alignment image by controlling the left-eye projector to output a first image of a pair of dipchoptic images, and the right-eye projector to output a second image of the pair of dipchoptic images.

12. The HMD device of claim 8, wherein the controller further is configured to switch the scanning display system from the display mode to the alignment mode in response to receiving a stimulus, the stimulus comprising one or more of a user request or a sensor output.

13. The HMD device of claim 12, wherein the controller is configured to switch the scanning display system from the display mode to the alignment mode by dynamically switching from a first control waveform to a second control waveform.

14. Enacted on a head mounted display (HMD) device comprising a scanning display system comprising a left-eye projector and a right-eye projector, a method comprising:
operating the scanning display system in a display mode in which the left-eye projector and the right-eye projector are controlled to present stereoscopic display images comprising a first field of view (FOV) and a first resolution;
changing the scanning display system to operate in an alignment mode in which the left-eye projector and the right-eye projector respectively are controlled to present a left-eye alignment image and a right-eye alignment image, one or more of the left-eye alignment image or the right-eye alignment image comprising a second FOV that is smaller than the first FOV and also comprising a second resolution that is higher than the first resolution;
receiving a user input in response to presenting the left-eye alignment image and the right-eye alignment image; and
based at least upon the user input, calibrating an alignment offset of the left-eye projector and the right-eye projector.

15. The method of claim 14, wherein presenting the left-eye alignment image and the right-eye alignment image comprising the second FOV and the second resolution comprises controlling a slow scan direction of the left-eye projector and the right-eye projector to increase scanned line density in the slow scan direction when operating in the alignment mode.

16. The method of claim 15, wherein presenting the left-eye alignment image and the right-eye alignment image by the scanning display system operating in the alignment mode comprises controlling the slow scan direction of the left-eye projector and the right-eye projector to have a linear trajectory.

17. The method of claim 14, wherein operating in the alignment mode in which the left-eye projector and the right-eye projector are controlled to present the left-eye alignment image and the right-eye alignment image comprises controlling the left-eye projector to output a first image of a pair of dipchoptic images, and the right-eye projector to output a second image of the pair of dipchoptic images.

18. The method of claim 14, wherein calibrating the alignment offset of the left-eye projector and the right-eye projector comprises storing the alignment offset, and adjusting a display position of at least one of the stereoscopic display images based on the alignment offset stored when in the display mode.

19. The method of claim 14, wherein changing the scanning display system to operate in the alignment mode comprises changing the scanning display system to operate in the alignment mode in response to receiving a user request to switch to the alignment mode.

20. The method of claim 14, wherein changing the scanning display system to operate in the alignment mode comprises changing the scanning display system to operate in the alignment mode in response to receiving a sensor output that meets a threshold condition.

* * * * *